United States Patent
Kempf

(10) Patent No.: US 7,460,275 B2
(45) Date of Patent: Dec. 2, 2008

(54) ODD/EVEN ERROR DIFFUSION FILTER

(75) Inventor: Jeffrey Kempf, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 554 days.

(21) Appl. No.: 09/727,609

(22) Filed: Dec. 1, 2000

(65) Prior Publication Data

US 2002/0067510 A1 Jun. 6, 2002

Related U.S. Application Data

(60) Provisional application No. 60/168,531, filed on Dec. 2, 1999.

(51) Int. Cl.
*G06K 15/00* (2006.01)
*H04N 1/40* (2006.01)
*H04N 1/405* (2006.01)

(52) U.S. Cl. ............ 358/3.03; 358/3.05; 358/3.06

(58) Field of Classification Search ......... 358/3.01, 358/3.03–3.05, 1.9, 3.06; 382/252
See application file for complete search history.

(56) References Cited

U.S. PATENT DOCUMENTS

| | | | | |
|---|---|---|---|---|
| 5,031,050 A | * | 7/1991 | Chan | 358/3.16 |
| 5,553,165 A | * | 9/1996 | Webb et al. | 382/252 |
| 5,627,659 A | * | 5/1997 | Kakutani | 358/443 |
| 5,880,857 A | * | 3/1999 | Shiau et al. | 358/3.03 |
| 5,892,851 A | * | 4/1999 | Nguyen | 382/252 |
| 6,118,513 A | * | 9/2000 | Delabastita et al. | 355/18 |
| 6,307,978 B1 | * | 10/2001 | Metaxas | 382/252 |
| 6,556,214 B1 | * | 4/2003 | Yamada et al. | 345/616 |

FOREIGN PATENT DOCUMENTS

| | | | |
|---|---|---|---|
| EP | 0631428 A2 | * | 12/1994 |
| EP | 0863661 A2 | * | 9/1998 |

* cited by examiner

*Primary Examiner*—Edward L. Coles
*Assistant Examiner*—James A. Thompson
(74) *Attorney, Agent, or Firm*—Charles A. Brill; Wade J. Brady, III; Frederick J. Telecky, Jr.

(57) ABSTRACT

An error diffusion method and system to ameliorate the effects of data quantization. The error diffusion method is especially well-suited to display systems that process groups of pixels in a given row (318) simultaneously. Errors generated when processing pixels in one row (318) of a first group (314) cannot be propagated to other pixels in the same row (318) of the same group (314) since the other pixels are processed by the time the error signal is available. The method and system pass errors from most of the pixels (302) in the group (314) to pixels below and to the right in the next row (320) of the same group (314). Errors from the last pixel (304) in the group (314) are passed to the pixel (308) in the following row (320) beneath the last pixel (304) and to the first pixel (310) in the next group (316) of pixels in the same row (318). To avoid creation of structured visual patterns, a white noise signal is added to the error signals. The noise error signal is created by generating a pseudo random number and adding the pseudo random number to one portion of the error signal while subtracting the pseudo random number from a second portion of the error signal. In effect, the pseudo random number changes the allocation of the error to among adjacent pixels, thus avoiding the structured visual artifacts caused by using deterministic diffusion filter coefficients.

25 Claims, 2 Drawing Sheets

ODD/EVEN ERROR DIFFUSION FILTER

This application claims priority under 35 USC § 119(e)(1) of provisional application no. 60/168,531 filed Dec. 2, 1999.

FIELD OF THE INVENTION

This invention relates to the field of display systems, more particularly to display systems using digital data, more particularly to digital display systems that use error diffusion to ameliorate the effects of quantization errors.

BACKGROUND OF THE INVENTION

Many display systems use digital image data to represent the image that is to be created. The digital data undergoes many processing steps to render each image and to prepare the image for display. For example, the image data is often scaled to change the resolution of the input image to that of the display modulator. Likewise, the intensity of the image may be altered to compensate for the type of modulator being used. For example, digital micromirror device (DMD™)-based displays must remove the gamma compensation that was added to the image data to facilitate display on a standard cathode ray tube display. The processing may alter the color space of the image stream to change the appearance of the projected image.

All of these image processing steps can increase the image data word size. Unfortunately, the image data word size of the display is often limited. For example, DMD-based displays use pulse width modulation to provide the appearance of gray scale images while using a binary light valve. Pulse width modulation requires a display frame period to be divided into a number of time slices equal to the number of possible gray levels. As the number of image data bits increases, the time slice representing the least significant bit slice becomes shorter than the response time of the modulator. Furthermore, increasing the number of bits increases the rate at which data must be loaded into the modulator. Due to either one of these factors, the image data word size must be limited, typically by truncating the image data word.

Truncating the image data word limits data rate into the modulator and limits the number of time slices that must be created each image frame. The truncation operation, however, necessarily creates quantization error which results in image artifacts. These artifacts, called false contours, appear as contours in the image that were not represented in the input image data.

Error diffusion methods have been developed to reduce the contouring effects of quantization errors. These error diffusion methods generally add the quantization error to surrounding pixels. Since the image data is generally processing in raster-scan format—from row-by-row from right to left and top to bottom—the pixels above and to the left of the pixel being processed have already been processed and the flow of the error signal is limited to the right and down.

New display processors process data for more than one pixel at a time. When several pixels are processed simultaneously, the standard down and to the right error flow cannot be implemented. What is needed is a new error diffusion method that is suitable for use in display systems that process multiple pixels simultaneously.

SUMMARY OF THE INVENTION

Objects and advantages will be obvious, and will in part appear hereinafter and will be accomplished by the present invention which provides a method and system for an odd/even error diffusion filter. One embodiment of the claimed invention provides a method of performing error diffusion. The method comprises the steps of: simultaneously processing image data for at least two pixels in a row of pixels, the pixels comprising a first group of pixels and a last pixel abutting a group of pixels to be processed next; reducing the precision of the image data to produce a modified image data word and an error word for each pixel; propagating a portion of the error word for each pixel in the first group to two pixels in a next row of pixels; and propagating a second portion of the error word for the last pixel to a pixel in the next row of pixels and a pixel in the group of pixels to be processed next. According to some embodiments, a pseudo random noise signal is added to the error signals to further reduce false contouring.

Another embodiment of the present invention provides a display system. The display system comprises a controller for receiving and processing pixelated image data, a light source for generating a beam of light along a first light path, and a light modulator for selectively modulating light along the first light path in response to image data signals from the controller.

The controller simultaneously processes image data for at least two pixels in a row of pixels, the pixels comprising a first group of pixels and a last pixel abutting a group of pixels to be processed next. The controller reduces the precision of the image data to produce a modified image data word and an error word for each pixel. The controller propagates a portion of the error word for each pixel in the first group to two pixels in a next row of pixels. The controller propagates a first portion of the error word for the last pixel to a pixel in said next row of pixels and a second portion of the error word for the last pixel to a pixel in said group of pixels to be processed next.

The improved error diffusion method and system described above greatly reduces the false contouring generated by data quantization. The described method enables the efficient propagation of error data words when multiple pixels in a row are processed simultaneously. Furthermore, the addition of the pseudo random noise to the error signal breaks up the structured visual artifacts caused by using only deterministic filter coefficients.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new error diffusion method and system have been developed to reduce the false contours created by quantization errors when multiple image pixels are processed simultaneously. Unlike prior error diffusion methods, this method alters the flow of the error signal depending on which pixel is being processed. Additionally, a white noise component is added to the error signal to break up structured visual artifacts that occur when an error component is diffused in the same manner row after row.

Figure 1:
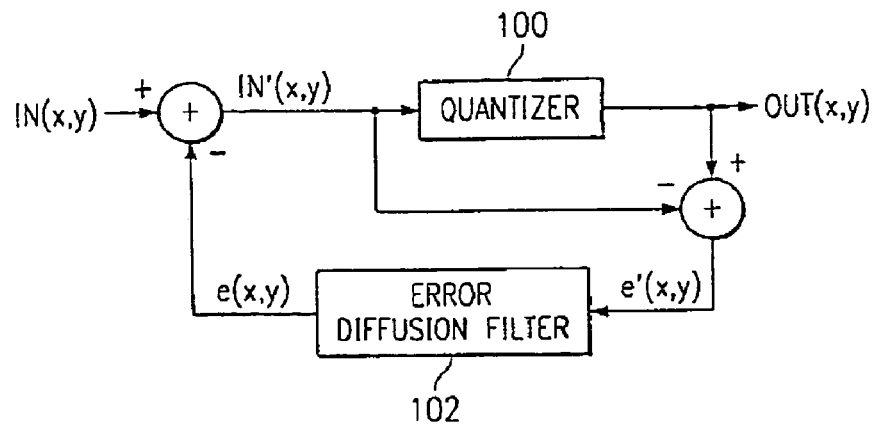
FIG. 1 is a schematic representation of an error diffusion process.

FIG. 1 is a schematic of an error diffusion process. An input signal, In(x,y), representing the image data for the pixel in row x and column y, is added to an error signal. The modified input signal In'(x,y) is quantized 100, typically by truncation, to obtain output signal Out(x,y). The output signal is the data word used by the display system to produce pixel(x,y). The output signal is compared to the modified input signal to obtain an error signal e'(x,y). When the quantization error is caused by truncation, the error signal e'(x,y) is the truncated portion of the modified input word In'(x,y). The error signal is modified by the error diffusion filter 102 and added to a later input word.

Figure 2:
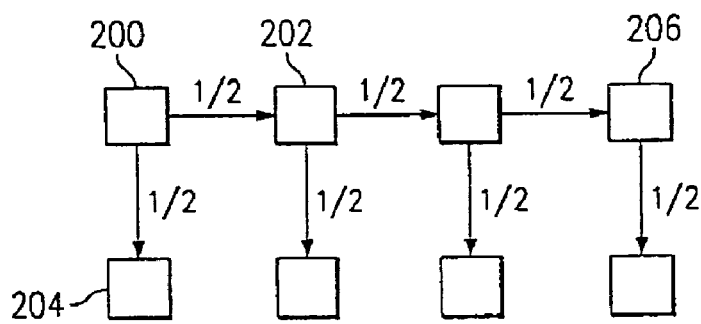
FIG. 2 is a schematic representation of the flow of an error signal from pixel to pixel according to a common prior art error diffusion method.

Various error diffusion algorithms differ by the operation of the error diffusion filter 102 shown in FIG. 1. FIG. 2 shows in schematic form the operation of a typical error diffusion filter. The error diffusion filter represented by FIG. 2 divides the error from pixel 200 in half. One half is delayed by one pixel and is added to the next pixel 202 in the row. The other half of the error is delayed by one row and is added to the pixel 204 directly below the current pixel. One half of the error from the last pixel in a row 206 is added to the last pixel in the next row and the other half of the error is discarded. Likewise, the portion of the error from the last row of pixels that would normally be added to the next row of pixels is also discarded.

Figure 3:
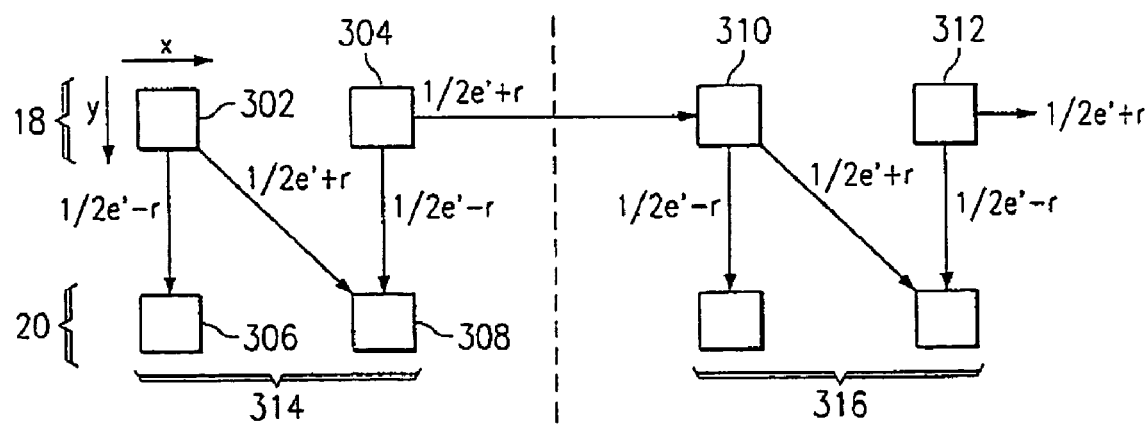
FIG. 3 is a schematic representation of the flow of an error signal from pixel to pixel according to the novel error diffusion scheme disclosed herein.

A problem arises when more than one adjacent pixels are processed simultaneously. FIG. 3 shows a portion of an array of pixels that is processed two at a time—a pixel from an odd numbered column and a pixel from an even numbered column. When pixels are processed two at a time, error from the first pixel 302 cannot be added to the second pixel 304 because it is processed before the error signal is determined. Therefore, one-half of the error from the odd pixel 302 is added to the odd pixel in the next row 306, while the other half of the error signal is added to the even pixel in the next row 308.

Error from the even pixel 304 can be added to the following pixel in the same row 310 because, as represented by the dashed line in FIG. 3, the next two pixels 310, 312 are processed after the first two pixels. Thus, one-half of the error from pixel 304 is added to the image data for pixel 310, and the other half of the error is added to the image data for pixel 308.

A pseudo random noise signal r(x,y) is added to the error signals to break up structured visual artifacts. The random noise signal is chosen to have a maximum value equal to one-half of the maximum value of the error signal. Thus, if four bits are truncated, the pseudo random noise generation generates a three-bit random noise signal. A new pseudo random noise data value is chosen for each pixel. The pseudo random noise data value is added to one-half of the error signal and subtracted from the other one-half of the error signal. In effect, the pseudo random noise data value determines the allocation of the error signal between the two pixels receiving a portion of the error signal.

Figure 4:
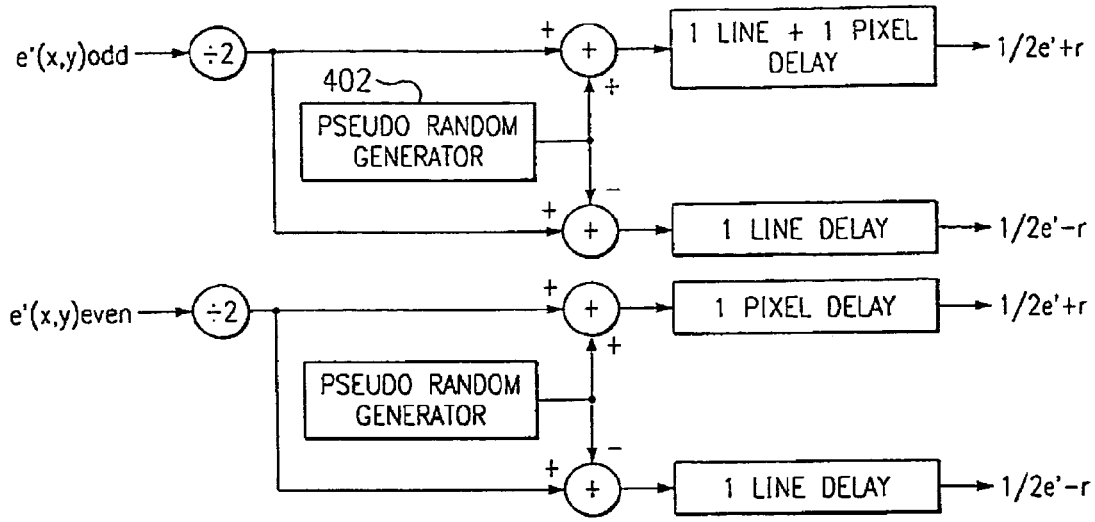
FIG. 4 is a schematic representation of the error diffusion filter of FIG. 1 implementing the error diffusion scheme of FIG. 3.

FIG. 4 illustrates the function of the error diffusion filter for the error diffusion embodiment illustrated in FIG. 3. In FIG. 4, the error signal from each odd pixel e'(x,y)$_{ODD}$, 302 in FIG. 3, is divided by two. A pseudo random number generator 402 creates a pseudo random number that is added to one half of the error signal, and subtracted from the other half. The sum of the error signal and the random number, $\frac{1}{2}$e'+r, is delayed by one row plus one pixel and added to the image data for the pixel below and to the right of the odd pixel, pixel 308 in FIG. 3. The difference between the error signal and the random number, $\frac{1}{2}$e'−r, is delayed by one row and then added to the image data for the pixel immediately below the current pixel, pixel 306 in FIG. 3.

Error signals from the even pixels, or from the last pixel in the processing group in the case of display systems that process more than two pixels simultaneously, are handled differently. As shown in FIG. 4, the error from the even pixel 304, e'(x,y)$_{EVEN}$, is divided by two before having another random number added to, or subtracted from, the result. The sum of one half of the error signal and the random number is delayed by only one pixel and is added to the image data for the next pixel in the same row, pixel 310 in FIG. 3. The difference between the other half of the error and the random number is delayed for one row and added to the even pixel in the next row, pixel 308 in FIG. 3.

As mentioned above, this same algorithm can be applied to display systems that process more than two pixels at a time. For example, if a the display system processes eight pixels at a time, errors from the first seven pixels are added to pixels from the next row while errors from the eighth pixel are added to the next pixel in the same row and a pixel from the next row.

Figure 5:
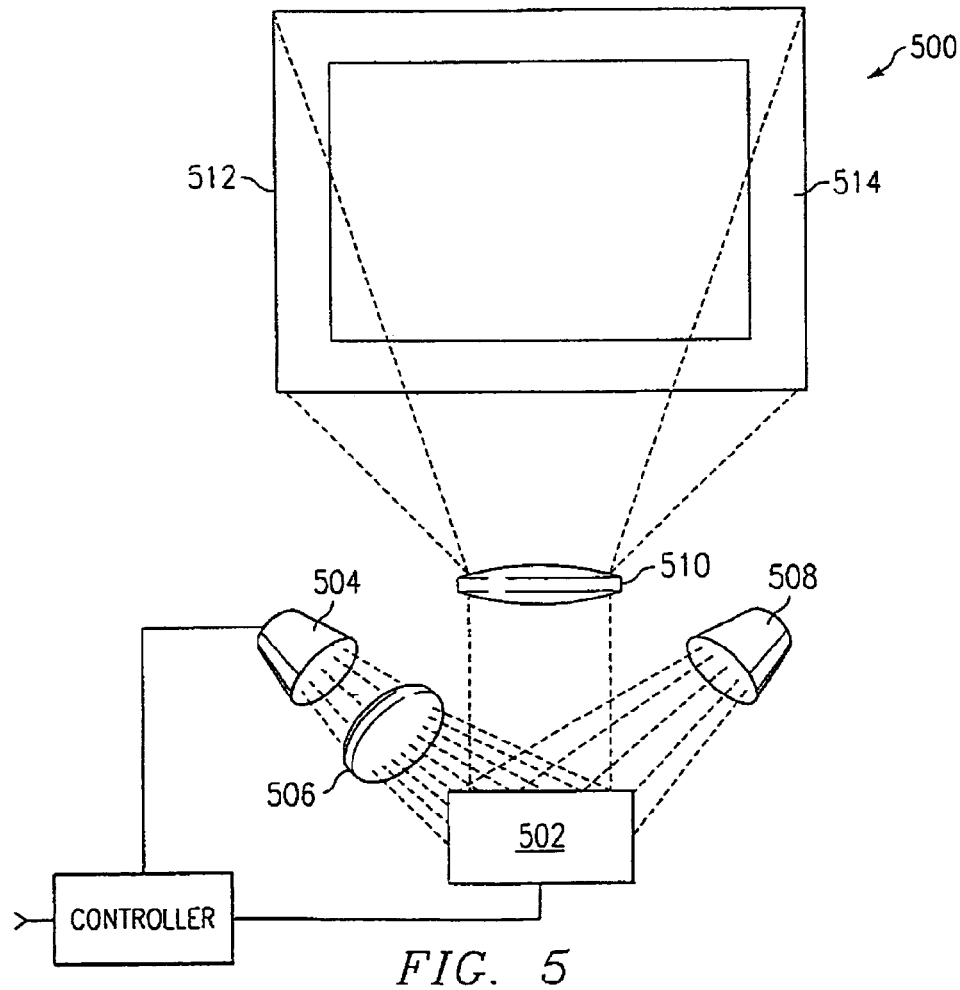
FIG. 5 is a schematic representation of a display system using the improved error diffusion filter of FIG. 4.

FIG. 5 is a schematic view of an image projection system 500 using an improved error diffusion method according to the present invention. In FIG. 5, light from light source 504 is focused on a micromirror 502 by lens 506. Although shown as a single lens, lens 506 is typically a group of lenses and mirrors which together focus and direct light from the light source 504 onto the surface of the micromirror device 502. Image data and control signals from controller 514, which performs the error diffusion operations described above, cause some mirrors to rotate to an on position and others to rotate to an off position. Mirrors on the micromirror device that are rotated to an off position reflect light to a light trap 508 while mirrors rotated to an on position reflect light to projection lens 510, which is shown as a single lens for simplicity. Projection lens 510 focuses the light modulated by the micromirror device 502 onto an image plane or screen 512.

The improved error diffusion method and system described above greatly reduces the false contouring generated by data quantization. The described method enables the efficient propagation of error data words when multiple pixels in a row are processed simultaneously. Furthermore, the addition of the white noise pseudo random number to the error signal avoids the structured visual artifacts that occur when using deterministic diffusion coefficients. Many alternatives to the disclosed system are possible. For example, the manner in which the pseudo random noise signal is added to one portion of the error word and subtracted from another portion of the error word could be reversed without departing from the spirit of this invention. Likewise, other embodiments generate two separate random numbers rather than adding and subtracting the same number. These alternate embodiments typically create positive and negative random numbers so that the average intensity value added by the white noise generator is zero.

Thus, although there has been disclosed to this point a particular embodiment for an improved error diffusion system and method, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of performing error diffusion, the method comprising the steps of:
   simultaneously processing image data for at least two pixels in a row of pixels, said at least two pixels comprising a first group of pixels and a last pixel, said last pixel abutting a group of pixels to be processed next in said row of pixels;
   reducing the precision of said image data to produce a modified image data word and an error word for each pixel;
   propagating none of said error word for each pixel in said first group to another pixel in said first group and a portion of said error word for each pixel in said first group to at least two pixels in a next row of pixels; and
   propagating a first portion of said error word for said last pixel to at least one pixel in said next row of pixels and a second portion of said error word for said last pixel to at least one pixel in said group of pixels to be processed next;
   outputting a data signal for causing a display corresponding to said at least two pixels in said next row of pixels at least in part in response to said portion of said error word for a pixel in said first group; and
   outputting a data signal for causing a display corresponding to said at least one pixel in said group of pixels to be processed next at least in part in response to said second portion of said error word.

2. The method of claim 1 further comprising the steps of:
   generating a pseudo random number; and
   wherein said propagating a portion of said error word for each pixel in said first group comprises:
      dividing said error word into a first and a second portion;
      subtracting said pseudo random number from said first portion to produce a first modified error word;
      adding said pseudo random number to said second portion to produce a second modified error word; and
      adding said first and said second modified error words to image data for a first and second pixel in said next row of pixels.

3. The method of claim 2, where said first modified error word is added to image pixel data for a pixel directly below the pixel generating the error signal.

4. The method of claim 2, where said second modified error word is added to image pixel data for a pixel directly below and to the right of the pixel generating the error signal.

5. The method of claim 1 further comprising the steps of:
   generating a pseudo random number, and
   wherein said propagating a portion of said error word for each pixel in said second group comprises:
      dividing said error word into a first and a second portion;
      subtracting said pseudo random number from said first portion to produce a first modified error word;
      adding said pseudo random number to said second portion to produce a second modified error word;
      adding said first modified error word to image data for a pixel in said next row of pixels; and
      adding said second modified error word to image data for a pixel in said group of pixels to be processed next.

6. The method of claim 1 further comprising the steps of:
   generating a pseudo random number; and
   wherein said propagating a portion of said error word for each pixel in said second group comprises:
      dividing said error word into a first and a second portion;
      adding said pseudo random number to said first portion to produce a first modified error word;
      subtracting said pseudo random number from said second portion to produce a second modified error word;
      adding said first modified error word to image data for a pixel in said next row of pixels; and
      adding said second modified error word to image data for a pixel in said group of pixels to be processed next.

7. The method of claim 1 further comprising the steps of:
   generating a first and second pseudo random number; and
   wherein said propagating a portion of said error word for each pixel in said first group comprises:
      dividing said error word into a first and a second portion;
      adding said first pseudo random number to said first portion to produce a first modified error word;
      adding said second pseudo random number to said second portion to produce a second modified error word; and
      adding said first and said second modified error words to image data for a first and second pixel in said next row of pixels.

8. The method of claim 1 further comprising the steps of:
   generating a first and second pseudo random number; and
   wherein said propagating a portion of said error word for each pixel in said second group comprises:
      dividing said error word into a first and a second portion;
      adding said first pseudo random number to said first portion to produce a first modified error word;
      adding said second pseudo random number to said second portion to produce a second modified error word;
      adding said first modified error word to image data for a pixel in said next row of pixels; and
      adding said second modified error word to image data for a pixel in said group of pixels to be processed next.

9. The method of claim 1 further comprising the steps of:
   generating a first pseudo random number, and
   wherein said propagating a portion of said error word for each pixel in said first group comprises:
      dividing said error word into a first and a second portion;
      adding said pseudo random number to said first portion to produce a first modified error word;
      subtracting said pseudo random number from said second portion to produce a second modified error word; and
      adding said first and said second modified error words to image data for a first and second pixel in said next row of pixels.

10. The method of claim 1 further comprising the steps of:
    generating a first and second pseudo random number; and
    wherein said propagating a portion of said error word for each pixel in said second group comprises:
       dividing said error word into a first and a second portion;
       adding said first pseudo random number to said first portion to produce a first modified error word;
       subtracting said second pseudo random number from said second portion to produce a second modified error word;
       adding said first modified error word to image data for a pixel in said next row of pixels; and
       adding said second modified error word to image data for a pixel in said group of pixels to be processed next.

11. The method of claim 1 further comprising the steps of:
generating a first and second pseudo random number; and
wherein said propagating a portion of said error word for each pixel in said second group comprises:
dividing said error word into a first and a second portion;
subtracting said first pseudo random number from said first portion to produce a first modified error word;
adding said second pseudo random number to said second portion to produce a second modified error word;
adding said first modified error word to image data for a pixel in said next row of pixels; and
adding said second modified error word to image data for a pixel in said group of pixels to be processed next.

12. The method of claim 1 wherein said at least two pixels in a row of pixels are neighboring pixels.

13. A display system comprising:
a controller for receiving and processing pixelated image data said controller:
simultaneously processing image data for at least two pixels in a row of pixels, said at least two pixels comprising a first group of pixels and a last pixel, said last pixel abutting a group of pixels to be processed next in said row of pixels;
reducing the precision of said image data to produce a modified image data word and an error word for each pixel;
propagating none of said error word for each pixel in said first group to another pixel in said first group and a portion of said error word for each pixel in said first group to at least two pixels in a next row of pixels; and
propagating a first portion of said error word for said last pixel to at least one pixel in said next row of pixels and a second portion of said error word for said last pixel to at least one pixel in said group of pixels to be processed next;
a light source for generating a beam of light along a first light path; and
a light modulator for selectively modulating light along said first light path in response to image data signals from said controller.

14. The display system of claim 13, said controller:
generating a pseudo random number; and
wherein said propagating a portion of said error word for each pixel in said first group comprises:
dividing said error word into a first and a second portion;
subtracting said pseudo random number from said first portion to produce a first modified error word;
adding said pseudo random number to said second portion to produce a second modified error word; and
adding said first and said second modified error words to image data for a first and second pixel in said next row of pixels.

15. The display system of claim 13, said controller.
generating a pseudo random number, and
wherein said propagating a portion of said error word for each pixel in said second group comprises:
dividing said error word into a first and a second portion;
subtracting said pseudo random number from said first portion to produce a first modified error word;
adding said pseudo random number to said second portion to produce a second modified error word;
adding said first modified error word to image data for a pixel in said next row of pixels; and
adding said second modified error word to image data for a pixel in said group of pixels to be processed next.

16. The display system of claim 13, said controller:
generating a pseudo random number; and
wherein said propagating a portion of said error word for each pixel in said second group comprises:
dividing said error word into a first and a second portion;
adding said pseudo random number to said first portion to produce a first modified error word;
subtracting said pseudo random number from said second portion to produce a second modified error word;
adding said first modified error word to image data for a pixel in said next row of pixels; and
adding said second modified error word to image data for a pixel in said group of pixels to be processed next.

17. The display system of claim 13, said controller:
generating a first and second pseudo random number; and
wherein said propagating a portion of said error word for each pixel in said first group comprises:
dividing said error word into a first and a second portion;
adding said first pseudo random number to said first portion to produce a first modified error word;
adding said second pseudo random number to said second portion to produce a second modified error word; and
adding said first and said second modified error words to image data for a first and second pixel in said next row of pixels.

18. The display system of claim 13, said controller:
generating a first and second pseudo random number; and
wherein said propagating a portion of said error word for each pixel in said second group comprises:
dividing said error word into a first and a second portion;
adding said first pseudo random number to said first portion to produce a first modified error word;
adding said second pseudo random number to said second portion to produce a second modified error word;
adding said first modified error word to image data for a pixel in said next row of pixels; and
adding said second modified error word to image data for a pixel in said group of pixels to be processed next.

19. The display system of claim 13, said controller
generating a first and second pseudo random number; and
wherein said propagating a portion of said error word for each pixel in said first group comprises:
dividing said error word into a first and a second portion;
adding said pseudo random number to said first portion to produce a first modified error word;
subtracting said pseudo random number from said second portion to produce a second modified error word; and
adding said first and said second modified error words to image data for a first and second pixel in said next row of pixels.

20. The display system of claim 13, said controller:
generating a first and second pseudo random number; and
wherein said propagating a portion of said error word for each pixel in said second group comprises:
dividing said error word into a first and a second portion;
adding said first pseudo random number to said first portion to produce a first modified error word;
subtracting said second pseudo random number from said second portion to produce a second modified error word;
adding said first modified error word to image data for a pixel in said next row of pixels; and
adding said second modified error word to image data for a pixel in said group of pixels to be processed next.

21. The display system of claim 13, said controller:
generating a first and second pseudo random number; and
wherein said propagating a portion of said error word for each pixel in said second group comprises:
dividing said error word into a first and a second portion;
subtracting said first pseudo random number from said first portion to produce a first modified error word;
adding said second pseudo random number to said second portion to produce a second modified error word;
adding said first modified error word to image data for a pixel in said next row of pixels; and
adding said second modified error word to image data for a pixel in said group of pixels to be processed next.

22. The display system of claim 13 wherein said at least two pixels in a row of pixels are neighboring pixels.

23. A method of performing error diffusion, the method comprising the steps of:
simultaneously processing image data for at least two pixels in a row of pixels, said at least two pixels comprising a first group of pixels and a last pixel, said last pixel abutting a group of pixels to be processed next in said row of pixels;
reducing the precision of said image data to produce a modified image data word and an error word for each pixel;
propagating portions of said error word for each pixel in said first group only to pixels in a next row of pixels; and
propagating a first portion of said error word for said last pixel to at least one pixel in said next row of pixels and a second portion of said error word for said last pixel to at least one pixel in said group of pixels to be processed next;
outputting a data signal for causing a display corresponding to said pixels in said next row of pixels at least in part in response to said portions of said error; and
outputting a data signal for causing a display corresponding to said at least one pixel in said group of pixels to be processed next at least in part in response to said second portion of said error word.

24. The method of claim 23 further comprising the steps of:
generating a pseudo random number; and
wherein said propagating a portion of said error word for each pixel in said first group comprises:
dividing said error word into a first and a second portion;
subtracting said pseudo random number from said first portion to produce a first modified error word;
adding said pseudo random number to said second portion to produce a second modified error word; and
adding said first and said second modified error words to image data in said next row of pixels.

25. The method of claim 23 wherein said at least two pixels in a row of pixels are neighboring pixels.

* * * * *